(12) United States Patent
Li

(10) Patent No.: US 6,592,090 B1
(45) Date of Patent: Jul. 15, 2003

(54) OBJECT SUPPORTING STRUCTURE

(76) Inventor: Chin-chu Li, P.O. Box 26-757, Taipei (TW), 106

( * ) Notice: Subject to any disclaimer, the term of this patent is extended or adjusted under 35 U.S.C. 154(b) by 0 days.

(21) Appl. No.: 10/227,899

(22) Filed: Aug. 23, 2002

(51) Int. Cl.[7] ............................................. E04G 3/00
(52) U.S. Cl. ........................... 248/284.1; 248/286.1; 248/921
(58) Field of Search .................... 248/278.1, 279.1, 248/276.1, 415, 284.1, 286.1, 281.11, 292.11, 181.2, 917, 918, 919, 920, 921, 922, 923

(56) References Cited

U.S. PATENT DOCUMENTS

| | | | | |
|---|---|---|---|---|
| 5,553,820 A | * | 9/1996 | Karten et al. | 248/286.1 |
| 5,799,917 A | * | 9/1998 | Li | 248/284.1 |
| 5,975,472 A | * | 11/1999 | Hung | 248/278.1 |
| 6,367,756 B1 | * | 4/2002 | Wang | 248/278.1 |
| 6,394,403 B1 | * | 5/2002 | Hung | 248/276.1 |

* cited by examiner

*Primary Examiner*—Ramon Ramirez
(74) *Attorney, Agent, or Firm*—Rosenberg, Klein & Lee

(57) ABSTRACT

An object supporting structure includes a load element that is downwardly connected to a first U-shaped piece that is connected by abutment to a sliding axle of a connecting element. The connecting element is provided with a second U-shaped piece that is placed inside the first U-shaped piece. Thereby, a loading charge of the load element is uniformly distributed on the connecting element by means of the first and second U-shaped pieces. As a result, the loading charge from the load element is dissipated, which prevents the connecting element from receiving an excessive loading charge so that the sliding axle can favorably slide along the grooves of the attachment base.

6 Claims, 9 Drawing Sheets

OBJECT SUPPORTING STRUCTURE

BACKGROUND OF THE INVENTION

1. Field of the Invention

The invention relates to an object supporting structure and, more particularly, to an object supporting structure that can be easily slidably adjusted.

2. Description of the Related Art

FIG. 1 and FIG. 2 illustrate an object supporting structure of the prior art that is disclosed in U.S. Pat. No. 5,799,917, which is incorporated herein by reference. The supporting structure principally comprises a carrier arm 10a that inwardly includes a load element 11a (such as a pneumatic jack or spring), and is downwardly connected to an attachment block 14a. The load element 11a is downwardly connected to a connecting element 12a that is provided with a sliding axle 13a that inserts through left and right grooves 15a formed through two sides of the attachment block 14a. The load element 11a can be thereby slidably adjusted.

However, the construction of the above supporting structure produces an excessive loading charge exerted on the connecting element 12a. The sliding axle 13a therefore does not easily slides in the grooves 15a.

SUMMARY OF THE INVENTION

It is therefore a principal object of the invention to provide an object supporting structure that can dissipate the loading charge of the load element and prevent the connecting element from receiving an excessive loading charge, so that the sliding axle can favorably slide along the grooves of the attachment base.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
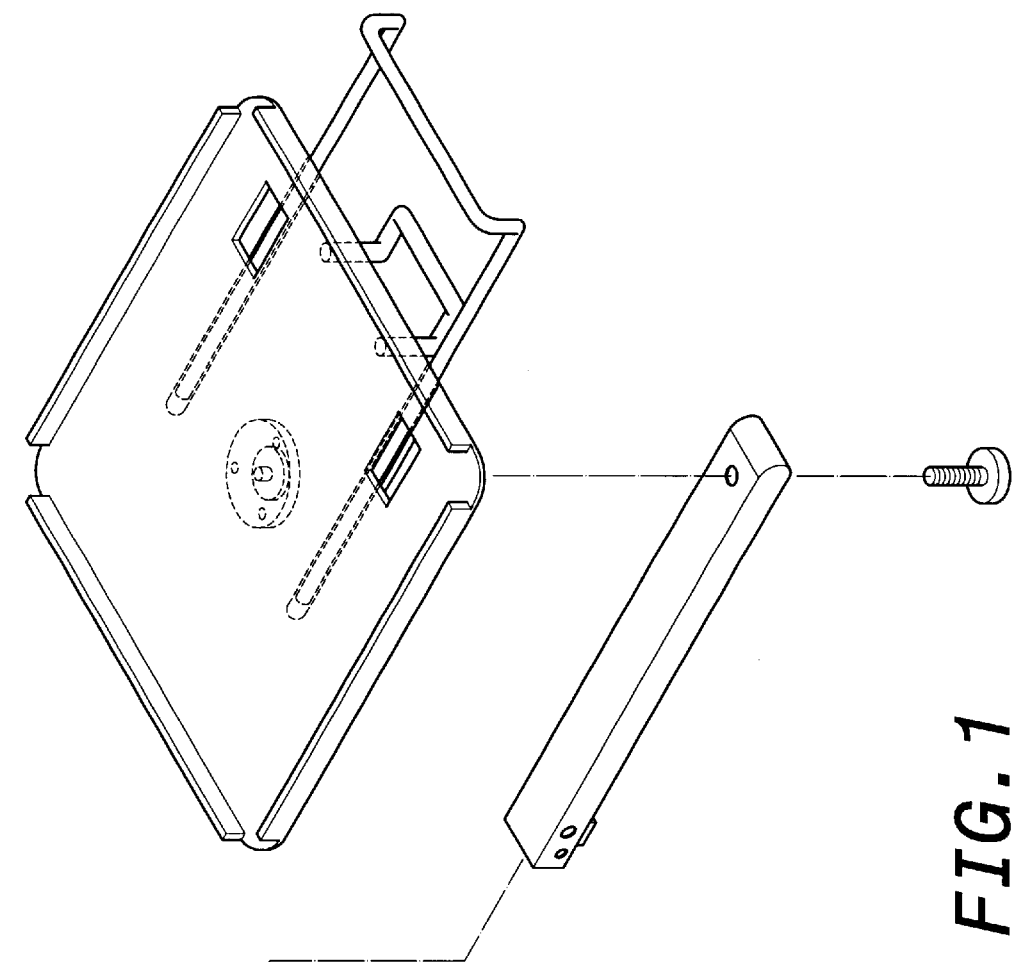
FIG. 1 is an exploded view of an object supporting structure known in the prior art.
Figure 1:
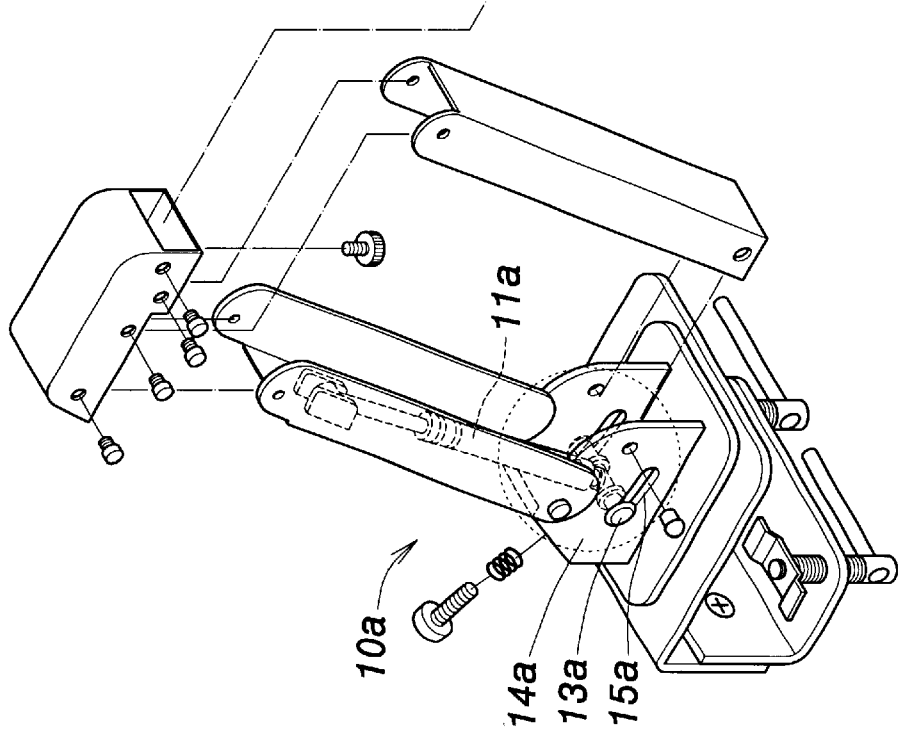
Figure 2:
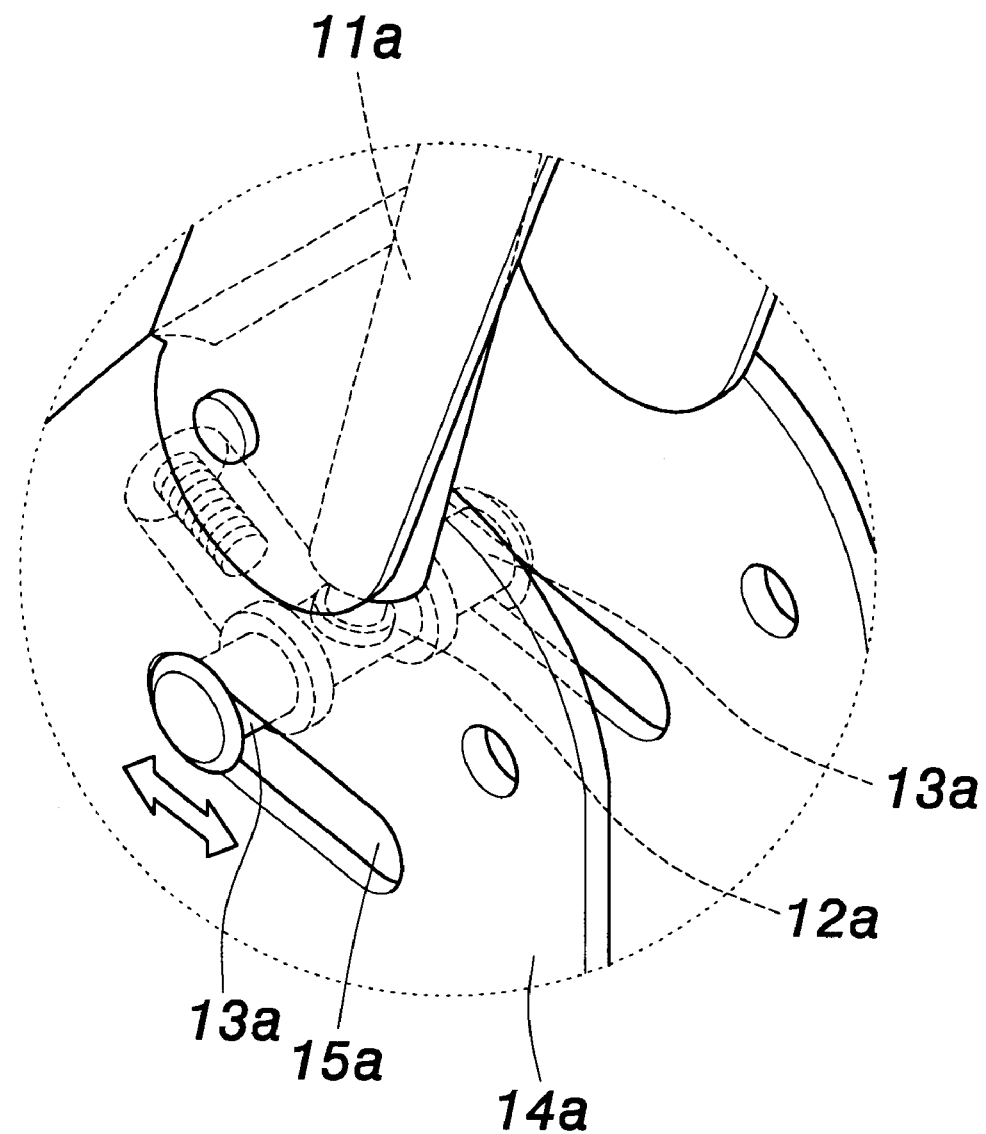
FIG. 2 is a locally enlarged view schematically illustrating the assembly of the load element and the connecting element of the object supporting structure of the prior art.

Wherever possible in the following description, like reference numerals will refer to like elements and parts unless otherwise illustrated.

Referring to FIG. 3 through FIG. 6, the invention provides an object supporting structure the construction of which includes a carrier arm 10, a clamping base 11, and a socle 12.

The carrier arm 10 comprises two arm bodies 13, 14 that assemble with each other in a manner to form a hollow body. A lower end of each arm body 13, 14 is pivotally connected to an attachment block 17 via hinges 15, 16. The carrier arm 10 internally includes a load element 18 that is, for example, a pneumatic jack. An extendable and retractable rod mounted at an upper end of the load element 18 is connected to a connecting part 31 inside the arm body 13. A lower end of the load element 18 is connected via a fulcrum assembly to the attachment block 17. The fulcrum assembly (detailed hereafter) comprises a threaded rod position adjuster 19 that, by rotation, varies the support inclination angle of the load element 18. Besides the present embodiment where it is a pneumatic jack, the load element 18 may include other types of devices such as a resilient spring.

The arm bodies 13, 14 are upwardly assembled via an interconnecting element 21 with a horizontal rod 22. The arm bodies 13, 14 are locked to the interconnecting element 21 via a screw assembly 20, and the rod 22 is mounted by insertion through a front side of the interconnecting element 21, locked via a plurality of screws 23 and a locking screw 32.

The clamping base 11 is connected to a lower side of the attachment block 17, and has an approximately U-shaped base body 24. A lower side of the base body 24 is provided with a pressing plate 26 that is moved upward/downward via the rotation of a threaded rod 25 to fix the object supporting structure via clamping or detach it.

The socle 12 is, for example, a relatively flat tray a front portion of which is mounted with a frame 27. A lower central portion of the socle 12 includes a threaded hole 28 to which corresponds a through-hole 30 formed at a front end of the rod 22. A locking screw 29 engages through the threaded hole 28 and the through-hole 30 to fasten the socle 12 with the rod 22. Different objects such as a computer monitor (not shown) thereby can be placed on the socle 12 while a keyboard (not shown), for example, can be placed on the pulled out frame 27.

Figure 3:
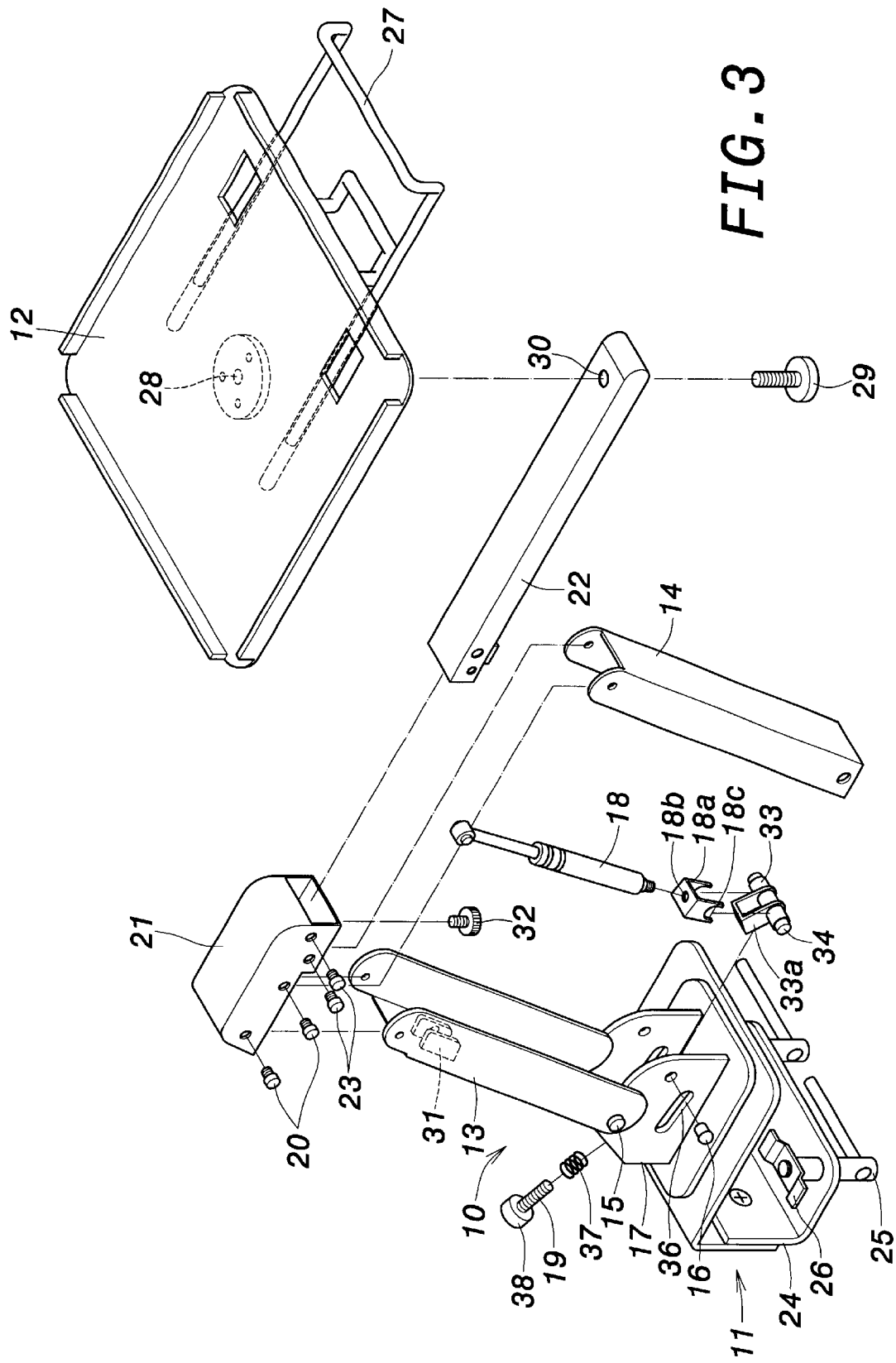
FIG. 3 is an exploded view illustrating the assembly of an object supporting structure according to a first embodiment of the invention.
Figure 4:
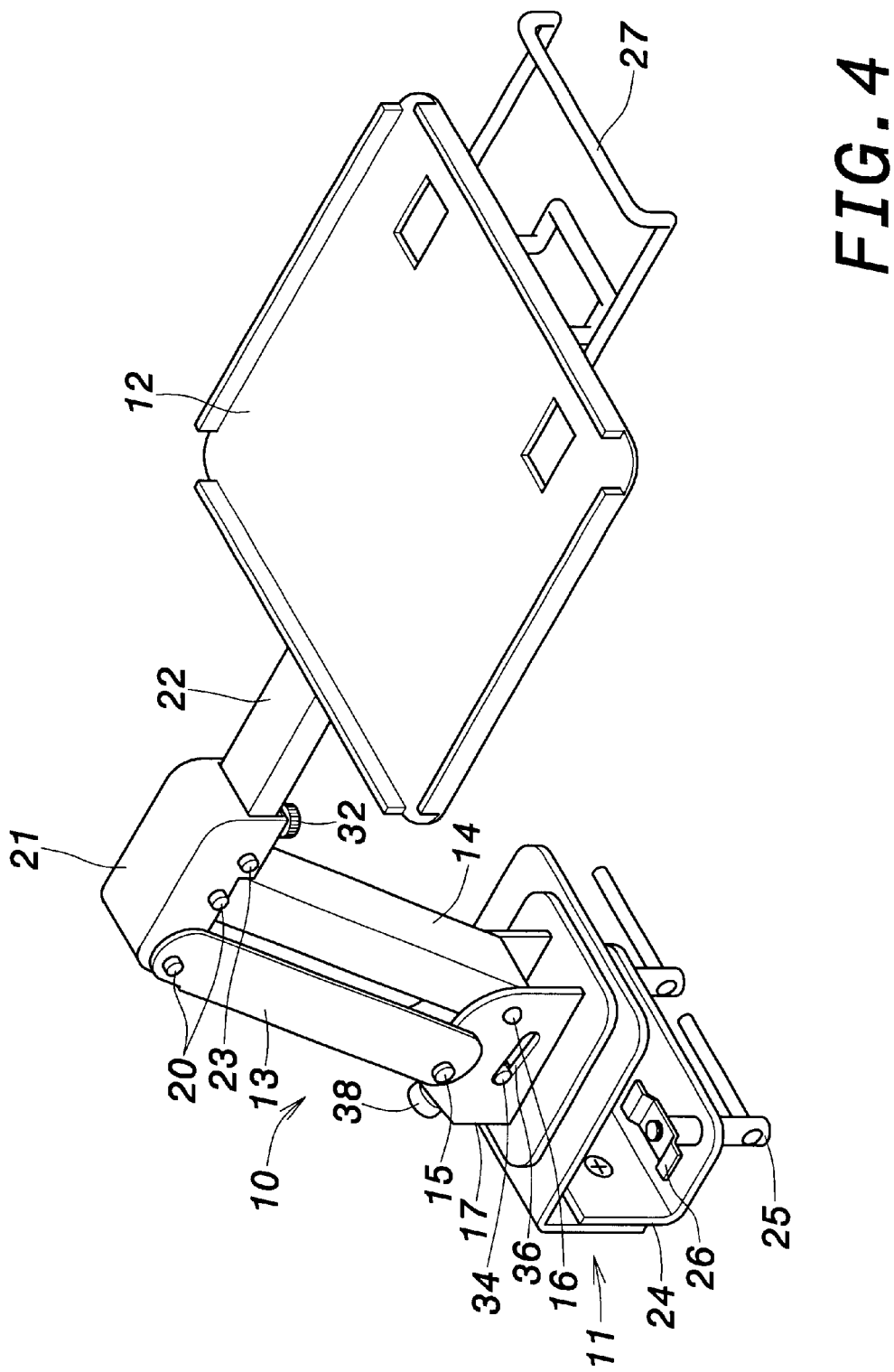
FIG. 4 is a perspective view of the object supporting structure according to the first embodiment of the invention.
Figure 5:
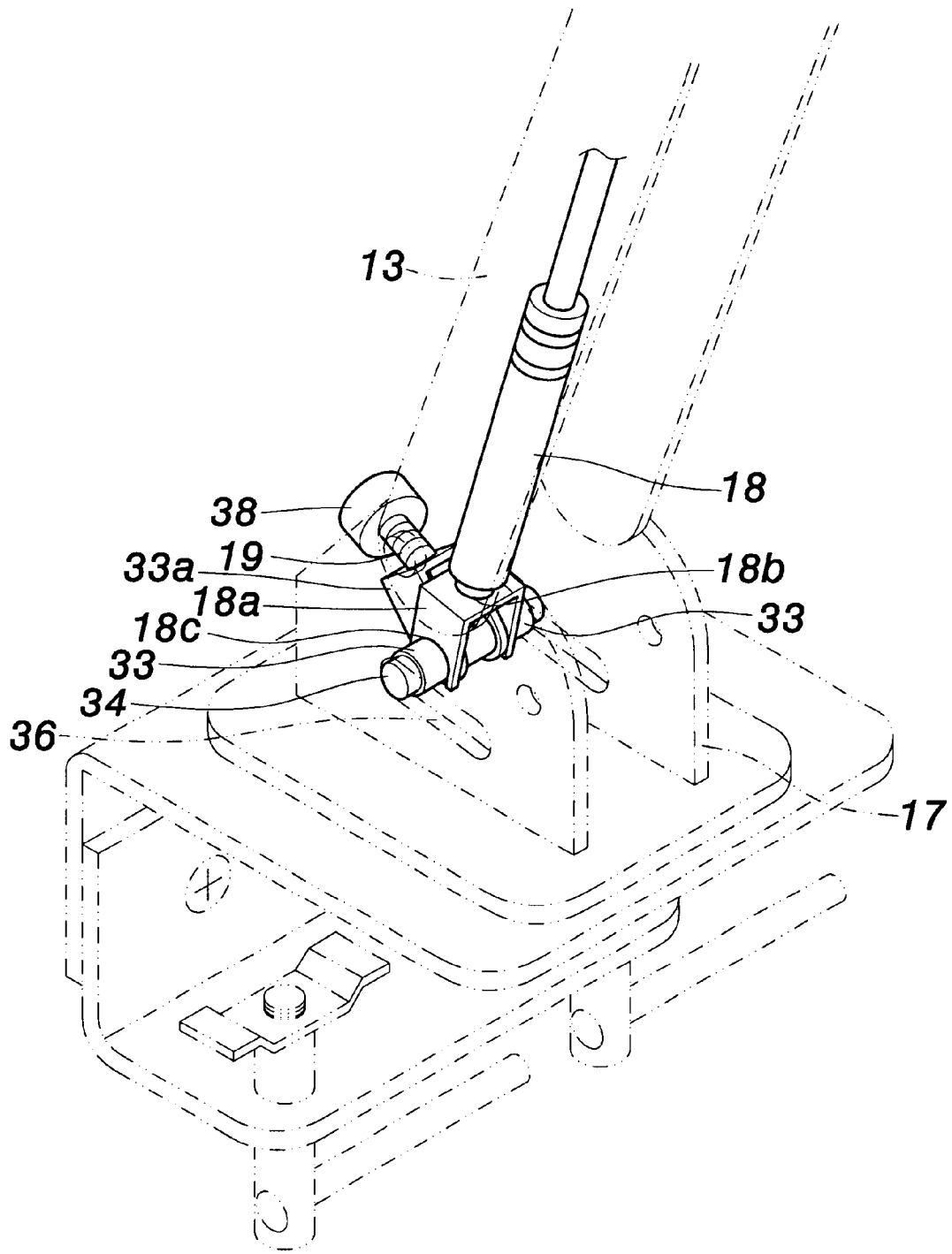
FIG. 5 is an enlarged view illustrating the assembly of the load element, the first and second U-shaped pieces, and the connecting element of the object supporting structure according to the first embodiment of the invention.

According to a preferred embodiment of the invention, the fulcrum assembly of the load element 18 is constructed via attaching the lower end of the load element 18 to a first generally U-shaped piece 18a (as shown in FIG. 3 and FIG. 5). A base of the first U-shaped piece 18a centrally includes a threaded hole 18b through which the lower end of the load element 18 is fixedly fastened. Two sides of the first U-shaped piece 18a respectively terminate in arcuate notches 18c corresponding to each other. The arcuate notches 18c abut against a sliding axle 34 of a connecting element 33.

Figure 6:
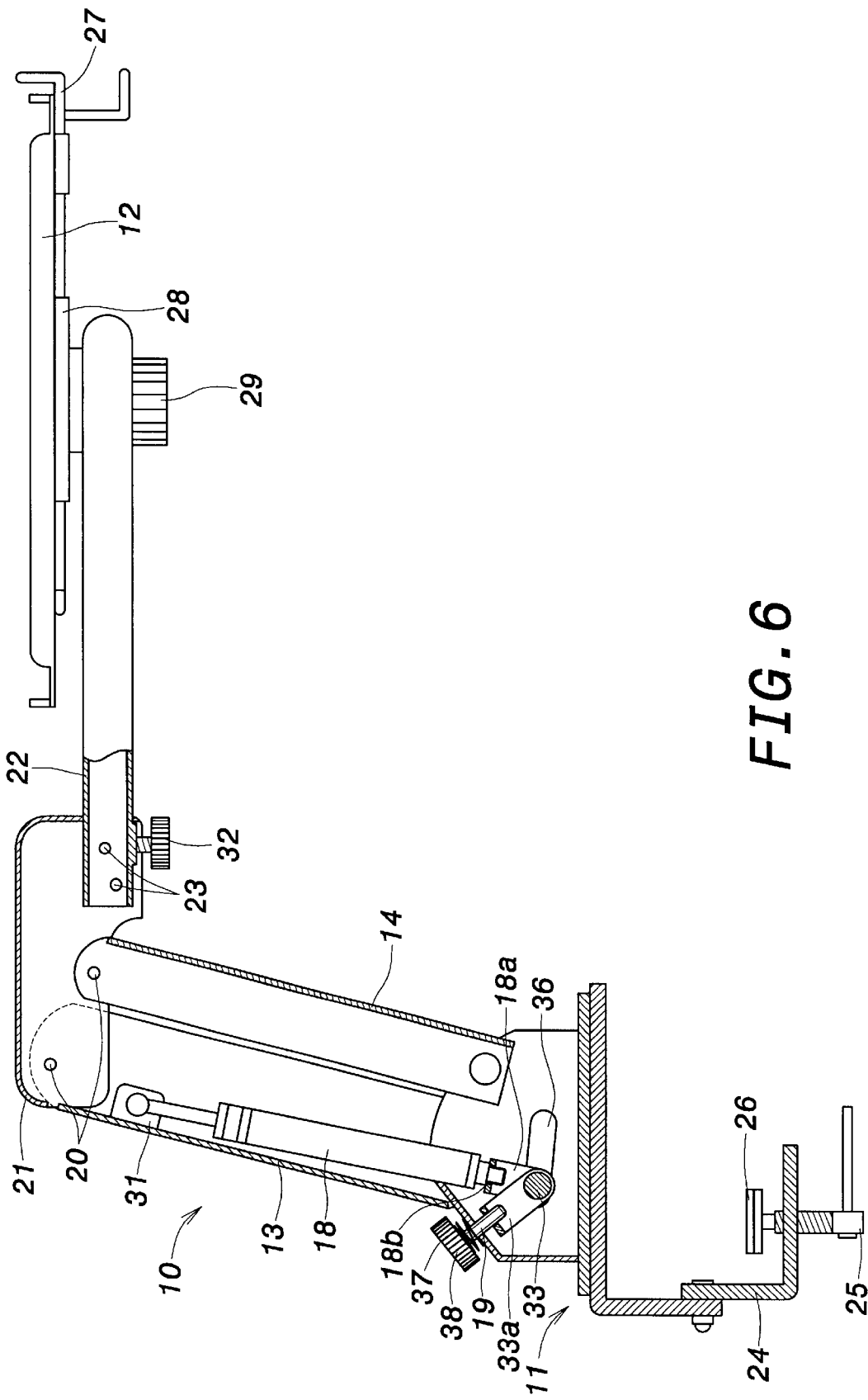
FIG. 6 is a sectional view of the object supporting structure according to the first embodiment of the invention.

As shown in FIG. 3 and FIG. 5, the sliding axle 34 extends sideways at left and right sides of the connecting element 33 that is further provided with a second U-shaped piece 33a. The first U-shaped piece 18a is mounted to the sliding axle 34 adjacently external to the sides of the second U-shaped piece 33a that therefore block the transversal displacement of the first U-shaped piece 18a. A pivotal connection between the first U-shaped piece 18a and the sliding axle 34 is thereby achieved. The sliding axle 34 further inserts through two sliding grooves 36 formed through two opposite left and right sides of the attachment block 17. The threaded rod position adjuster 19 upwardly terminates in a rotary cap 38 that is externally located at a rear side of the attachment block 17. The threaded rod position adjuster 19 passes through the attachment block 17 to screw with the second U-shaped piece 33a (as shown in FIG. 6). Furthermore, a spring 37 is mounted over the threaded rod position adjuster 19 between the rotary cap 38 and the rear side of the attachment block 17.

Via the above fulcrum assembly, the support inclination angle of the load element 18 can be modified to obtain a uniform distribution of the loading charge on the connecting element 33 in accordance with the weight of the object placed on the socle 12. This adjustment is achieved via turning the totary cap 38 and the threaded rod position adjuster 19, which drives a move of the lower end of the load element 18 along the direction of the sliding grooves 36 that, preferably, extends obliquely to provide an adequate support inclination angle.

The rotation of the threaded rod position adjuster 19 drives the move of the connecting element 33. The load element 18 being connected through the first U-shaped piece 18a and the sliding axle 34 to the connecting element 33, this latter therefore substantially receives the loading force from the load element 18. The second U-shaped piece 33a is further used to reinforce and share the force of the connecting element 33. This arrangement facilitates the driving of the sliding axle 34 in the sliding grooves 36 by rotation of the rotary cap 38. A convenient adjustment operation is thereby provided.

Figure 7:
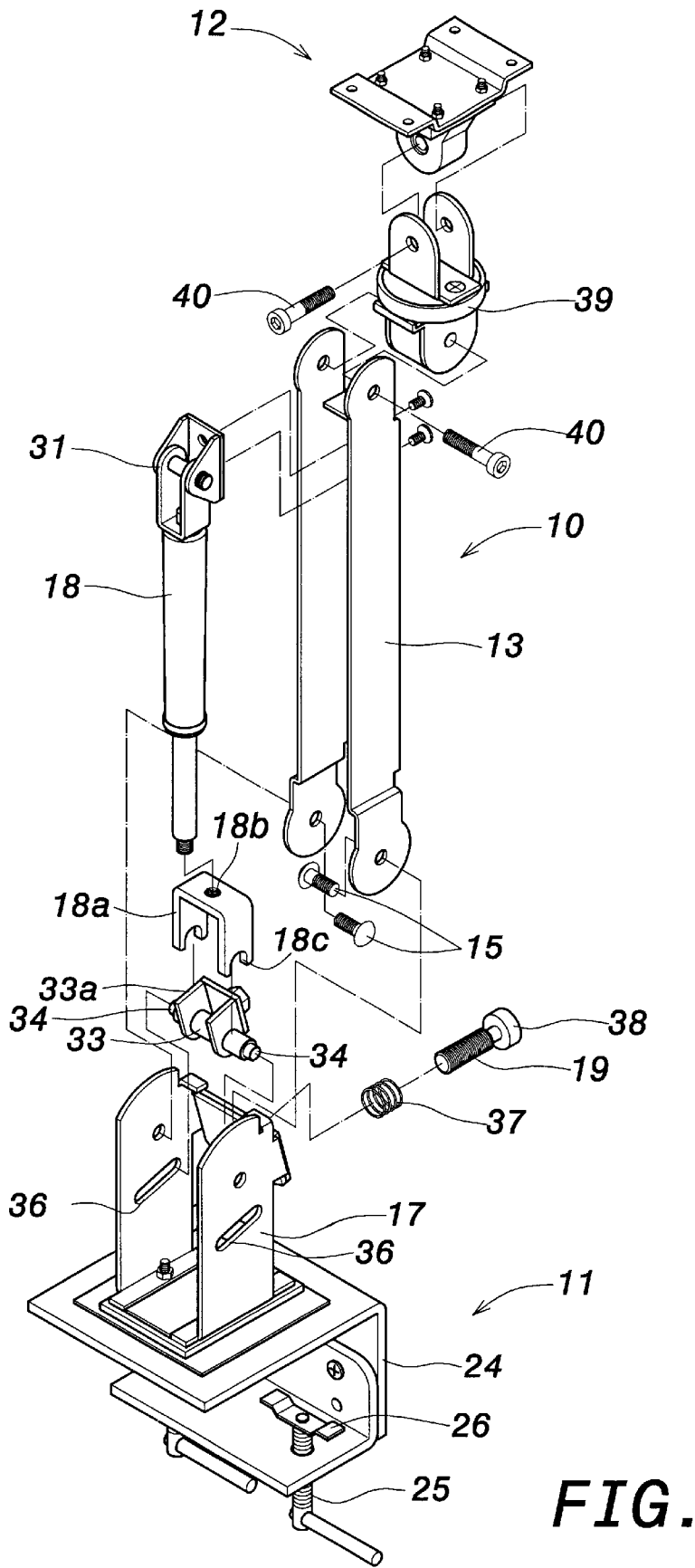
FIG. 7 is an exploded view illustrating the assembly of an object supporting structure according to a second embodiment of the invention.
Figure 8:
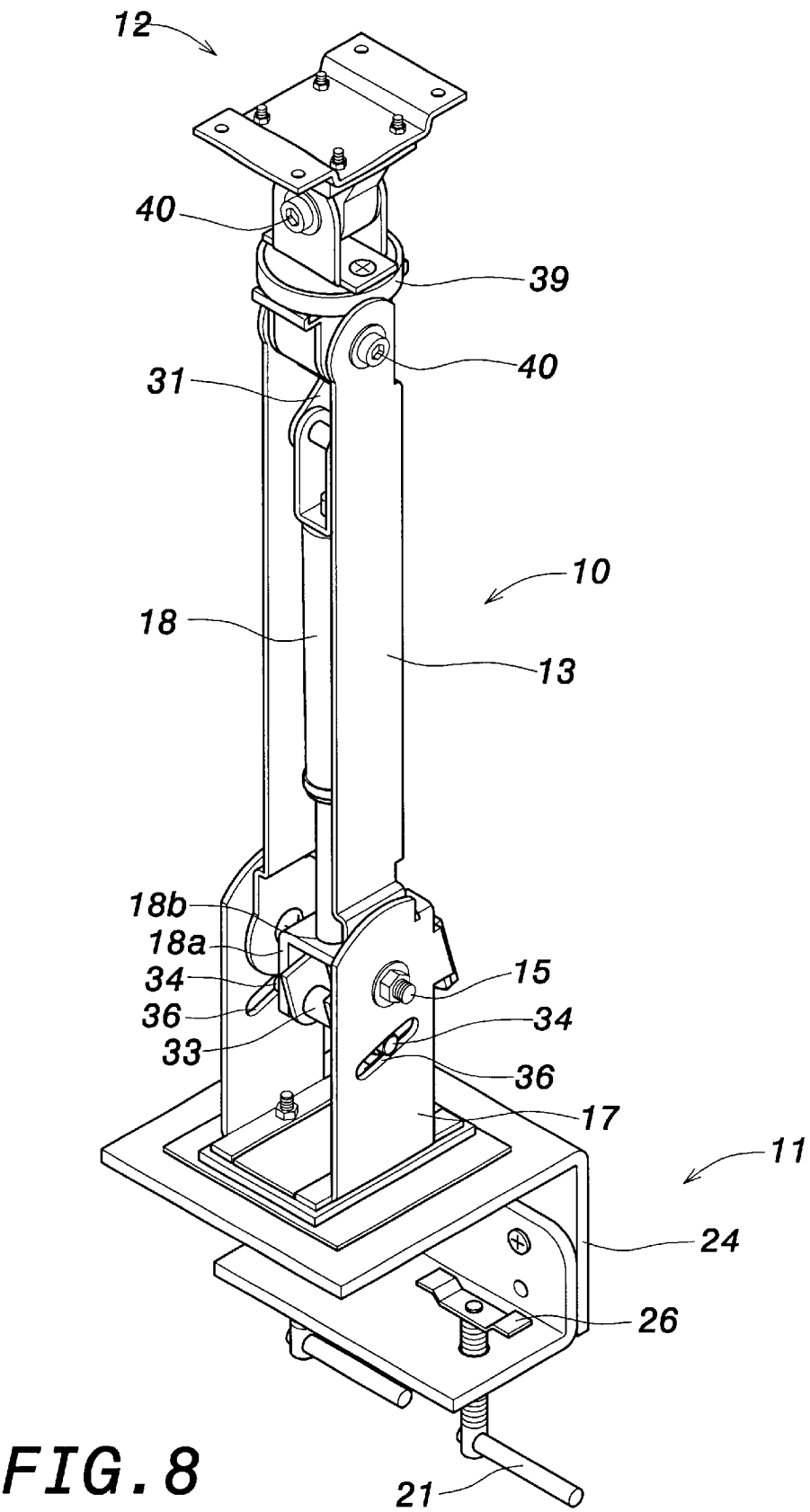
FIG. 8 is a perspective view of the object supporting structure according to the second embodiment of the invention.
Figure 9:
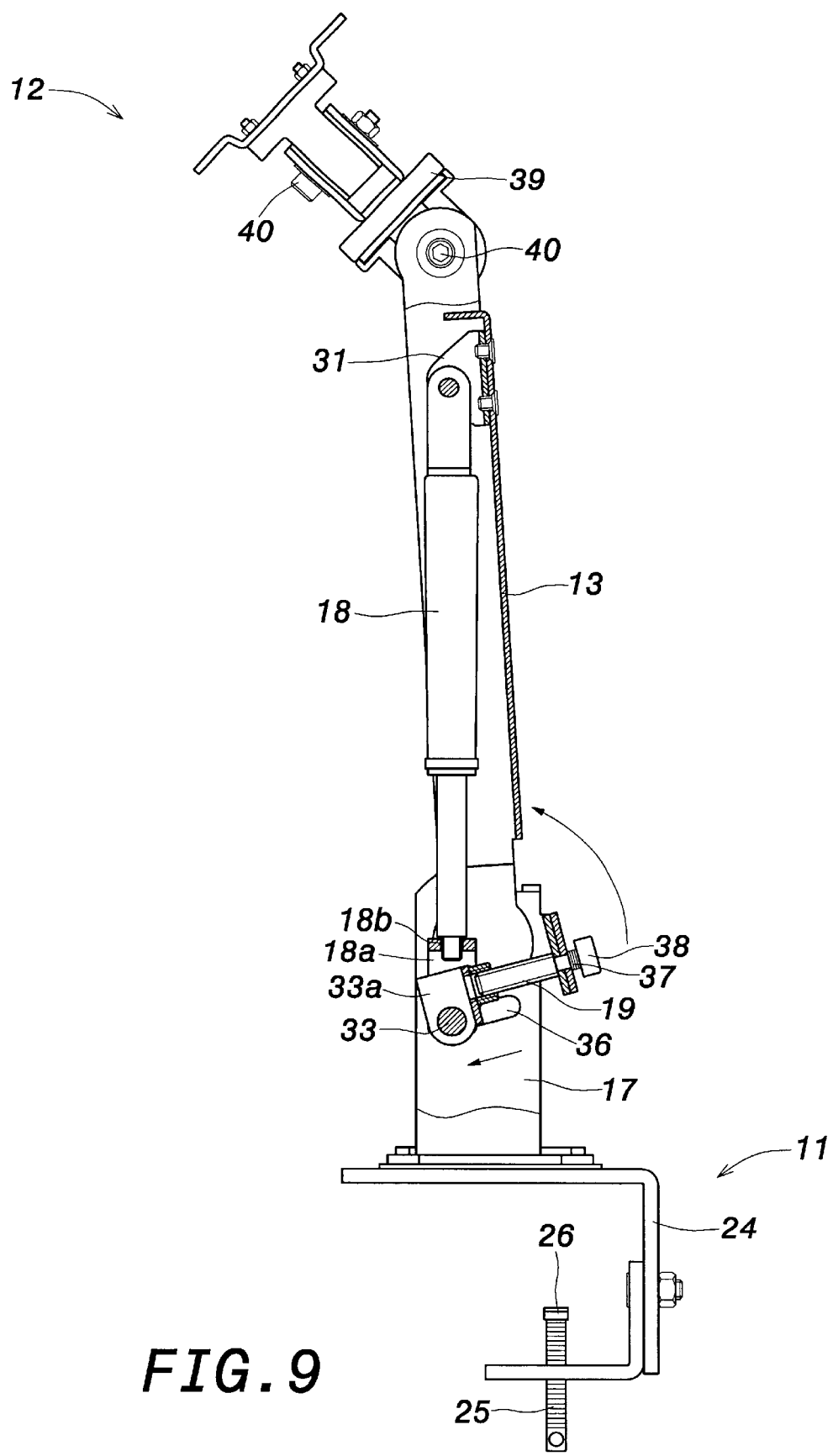
FIG. 9 is a side view illustrating the adjustment of the object supporting structure according to the second embodiment of the invention.

FIG. 7, FIG. 8, and FIG. 9 illustrate a second embodiment of the invention. As liquid crystal display (LCD) monitors become increasingly popular, the second embodiment of the invention provides a socle 12 that is specifically adapted to mount LCD monitors. As illustrated, a lower side of the socle 12 is pivotally connected onto a rotary head 39 via a hinge 40. The rotary head 39 is in turn pivotally connected to the upper end of the carrier arm 10 via another hinge 40. The position of the rotary head 39 can be adjusted to various angular orientations, which therefore a more convenient utilization. The other parts and elements of the second embodiment are similar to those of the first embodiment, their related description is therefore omitted.

Those skilled in the art will readily appreciate that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. An object supporting structure comprising:

a carrier arm including a lower end that is pivotally connected to an attachment block, and a load element mounted inside the carrier arm, the load element being upwardly connected to the carrier arm and further including a threaded rod position adjuster that terminates in a rotating cap at one external end;

a clamping base connected to the attachment block; and a socle locked at a front side of the carrier arm;

characterized in that a first U-shaped piece is connected with the load element and a connecting element has a sliding axle, the first U-shaped piece is connected to the sliding axle of the connecting element, the connecting element further including a second U-shaped piece that is placed inside the first U-shaped piece, and the threaded rod position adjuster passing through the attachment block to screw with the second U-shaped piece, thereby a loading force of the load element is uniformly distributed on the connecting element by means of the first U-shaped piece and the second U-shaped piece.

2. The structure of claim 1, wherein the carrier arm is formed from the assembly of a pair of arm bodies that defines a hollow body, the arm bodies being downwardly pivotally connected to the attachment block and upwardly assembled via an interconnecting element with a horizontal rod tat inserts through the interconnecting element, the socle at a downward side further includes a threaded hole to which corresponds a through-hole formed at a front end of the rod, a locking screw engaging through the threaded hole and the through-hole to fasten the socle with the rod.

3. The structure of claim 1, wherein the load element is a pneumatic jack.

4. The structure of claim 1, wherein the load element is a spring.

5. The structure of claim 1, wherein the first U-shaped piece terminates in arcuate notches that abut against the sliding axle of the connecting element.

6. The structure of claim 1, wherein the socle is pivotally connected to a rotary head that is pivotally connected to the carrier arm.

* * * * *